US006981580B2

(12) United States Patent
Meyer (10) Patent No.: US 6,981,580 B2
(45) Date of Patent: Jan. 3, 2006

(54) APPARATUS FOR ROTATING AN ARTICLE

(75) Inventor: Peter Meyer, Beringen (CH)

(73) Assignee: Robert Bosch GmbH, (DE)

( * ) Notice: Subject to any disclaimer, the term of this patent is extended or adjusted under 35 U.S.C. 154(b) by 0 days.

(21) Appl. No.: 10/863,802

(22) Filed: Jun. 8, 2004

(65) Prior Publication Data

US 2005/0011727 A1    Jan. 20, 2005

(30) Foreign Application Priority Data

Jul. 17, 2003    (CH) ................................ 1251/03

(51) Int. Cl.
 *B65G 47/24*    (2006.01)
(52) U.S. Cl. .................. 198/415; 198/779; 193/35 MD
(58) Field of Classification Search ................ 198/395, 198/415, 786, 787, 779; 193/35 MD
See application file for complete search history.

(56) References Cited

U.S. PATENT DOCUMENTS

| 1,641,642 | A | * | 9/1927 | Pangborn .................... 198/779 |
| 3,363,735 | A | | 1/1968 | Hotchkiss |
| 3,552,541 | A | | 1/1971 | Riggs |
| 3,621,961 | A | | 11/1971 | Stumpf |
| 4,901,842 | A | * | 2/1990 | Lemboke et al. ........... 198/415 |
| 5,082,109 | A | | 1/1992 | Blondeau |
| 5,396,977 | A | * | 3/1995 | Lantis et al. ................ 198/786 |
| 5,918,725 | A | * | 7/1999 | Farina ........................ 198/415 |
| 6,126,383 | A | | 10/2000 | Franklin et al. |
| 6,648,128 | B2 | * | 11/2003 | Yamashita et al. .......... 198/779 |
| 2003/0234155 | A1 | | 12/2003 | Kanamori et al. |

FOREIGN PATENT DOCUMENTS

| DE | 502510 | 12/1929 |
| DE | 1 198 735 | 6/1963 |
| DE | 2 202 256 | 1/1972 |
| DE | 30 16 940 A1 | 5/1980 |
| DE | 39 15 246 A1 | 5/1989 |
| DE | 199 48 704 C1 | 10/1999 |
| EP | 0 399 264 A1 | 5/1989 |
| EP | 0 472 984 A1 | 8/1990 |
| FR | 2 798 122 | 9/1999 |
| JP | 2000-335726 | 12/2000 |

OTHER PUBLICATIONS

Patent Abstracts of Japan re: JP 9 286515.
Patent Abstracts of Japan re: 59 138519.

* cited by examiner

*Primary Examiner*—James R. Bidwell
(74) *Attorney, Agent, or Firm*—Harness, Dickey & Pierce, P.L.C.

(57) ABSTRACT

An apparatus having approximately parallel conveyors (2, 2') for transporting and rotating an article (G) has multiple longitudinally arranged omnidirectional rollers (24), each omnidirectional roller (24) having multiple individual rollers (240) arranged about its periphery. The conveyors (2, 2') extend in a transporting direction (T), bear against the bottom of the article (G), and rotate the article about an axis perpendicular to the article bearing plane. At least one conveyor can be driven at a speed different from the other conveyor to transport and rotate the article on the conveyor. The bearing portion of article (G) is subject to direction-dependent coefficients of friction with the transporting direction (T) having a static or sliding coefficient of friction that is higher than the rolling coefficient of friction in the direction perpendicular (S) to the transporting direction (T).

10 Claims, 6 Drawing Sheets

APPARATUS FOR ROTATING AN ARTICLE

TECHNICAL FIELD

The invention relates to an apparatus for rotating an article. The apparatus is suitable, in particular, for transporting and rotating containers, for example boxes.

PRIOR ART

DE-A-39,15,246 discloses an apparatus which is intended for conveying articles and in which the articles are rotated in a controlled manner about an axis perpendicular to the conveying path as they are conveyed. Rotatable carriers, on which the articles which are to be rotated are arranged, are provided for this purpose.

DE-A-199,48,704 uses a turntable in order to rotate stacks of paper as they are transported.

EP-A-0,472,984 discloses a conveying and rotating apparatus with two conveying belts arranged one above the other. A round article which is to be rotated is transported on the bottom conveying belt which is provided with carry-along elements. Provided on the top conveying belt are downwardly projecting guide tracks which retain the article in position. Also provided are two lateral belts, which act on two opposite locations of the round article. The articles are rotated by virtue of the two lateral belts being driven at different speeds.

These apparatuses have the disadvantage that they have to be adapted to the shape and size of the articles which are to be transported.

Furthermore, DE-A-30,16,940 and EP-0,399,264 disclose apparatuses with lateral conveying belts which clamp in the articles which are to be rotated and rotate the latter by virtue of different conveying speeds.

These apparatuses mentioned above all have the disadvantage that they likewise have to be adapted to the respective size and shape of the articles. In addition, it is necessary for the static and sliding friction and the contact pressure to be optimized in each case in order that the articles can be rotated in a sufficiently precise position.

Transporting tables which can rotate articles are also known. The transporting tables are predominantly used in order to rotate the article in the desired direction at crossover points and branching locations. This is disclosed, for example, in DE-A-1,198,735 and U.S. Pat. No. 3,552,541. Further tables with omnidirectional rollers are described in U.S. Pat. No. 5,082,109, FR-A-2,798,122 and DE-A-2,202,256.

Such omnidirectional rollers have been known for some time now, for example in U.S. Pat. No. 3,363,735, U.S. Pat. No. 3,621,961, JP-2000335726 and DE-A-502,510.

DESCRIPTION OF THE INVENTION

It is an object of the invention to provide an apparatus which allows as precisely positioned rotation as possible and can be used for articles of different shapes and sizes.

This object is achieved by an apparatus having the features of patent claim 1.

The apparatus according to the invention for rotating an article has means for bearing a base surface of the article which is to be transported, these means being arranged in a bearing plane. The article is rotated about an axis running perpendicularly to this bearing plane. At least two conveyers which extend in the transporting direction and run at least more or less parallel to one another are provided. At least a first of these conveyors can be driven, with the result that at least that part of the article which rests on the associated means is transported in the transporting direction by it. This first conveyor has a transporting speed which is different from that of the other conveyors. The means for bearing the article form a constituent part of the conveyors. These means have direction-dependent coefficients of friction in respect of the bearing plane, these coefficients of friction being greater, in particular, in the transporting direction than in the direction which is perpendicular thereto, and runs in the transporting plane. Static or sliding friction takes effect in the transporting direction; rolling friction is active perpendicularly thereto.

Since the articles merely have to be positioned on the conveyors, and there is no need for any further rotary means adapted specifically to the shape and size of the articles, the apparatus can be used for different articles without any changes in design. Since the articles do not have to be clamped in-between mounts, it is possible for difficult articles to be reliably transported and rotated. In addition, the force which is necessary for rotation is minimized.

It is further advantageous that the apparatus requires only a relatively small number of elements and is thus straightforward and cost-effective to produce.

Using the same means, the articles can be both transported efficiently along a path and also rotated simultaneously, with sufficient positional accuracy, about an axis perpendicular to the transporting plane. This allows low-friction rotation. In addition, the time taken to transport the article is not delayed by its rotation.

The efficiency of the transporting and/or of the rotation operation may additionally be increased by at least two of the conveyors being driven, with the result that, in addition to the difference in speed which is necessary for the rotary movement, there is a common speed component which transports the article forward as it is rotated. The conveyors thus serve as longitudinal conveyors and as rotary conveyors.

It is also possible, however, for just one of the conveyors to be driven and thus merely for rotation to be carried out. It is further possible for one of the conveyors to move the article in the forward direction and for another conveyor to move it in the rearward direction, with the result that the article is rotated on the spot. In these two cases, the article is transported forward by other, known means, for example, slides, lateral conveying belts or conveying means which are adjacent to the conveyors according to the invention.

Each conveyor preferably has a plurality of such means, the means being arranged individually or in groups one behind the other in the transporting direction and having rollers. Each of these rollers preferably has an axis of rotation which, at least in the state in which the roller is in contact with the base surface of the article, runs at least more or less parallel to the transporting direction. The roller is preferably freely rotatable about this axis of rotation.

In a preferred embodiment, the rollers are retained in cages which can be rotated about an axis perpendicular to the transporting direction. These cage/roller structures are preferably omnidirectional rollers.

In another preferred embodiment, the contacting means are individual longitudinal rollers which are arranged one behind the other in the transporting direction on a strand-like pulling means.

The positional accuracy can be increased by aligning means which are arranged downstream of the longitudinal and rotary conveyors in the transporting direction. Such aligning means are, for example, lateral guides and/or separately driven and moveable stopper elements.

Further advantageous embodiments can be gathered from the dependent patent claims.

BRIEF DESCRIPTION OF THE DRAWINGS

The subject matter of the invention is explained hereinbelow with reference to preferred exemplary embodiments which are illustrated in the attached drawings, in which:

FIG. 4c shows a side view of the omnidirectional roller according to FIG. 4a;

METHODS OF IMPLEMENTING THE INVENTION

Figure 1:
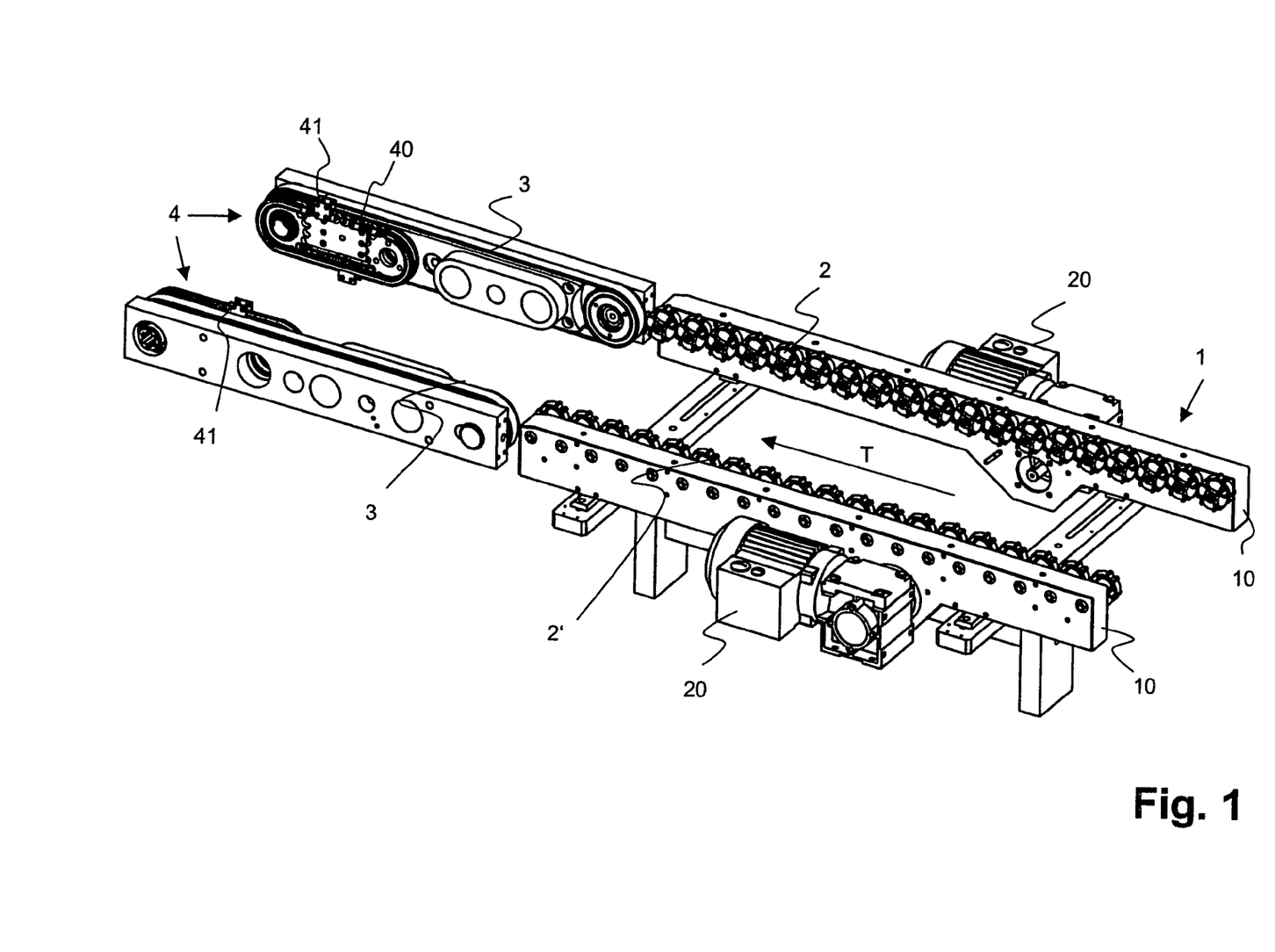
FIG. 1 shows a perspective view of a first embodiment of the apparatus according to the invention.
Figure 2:
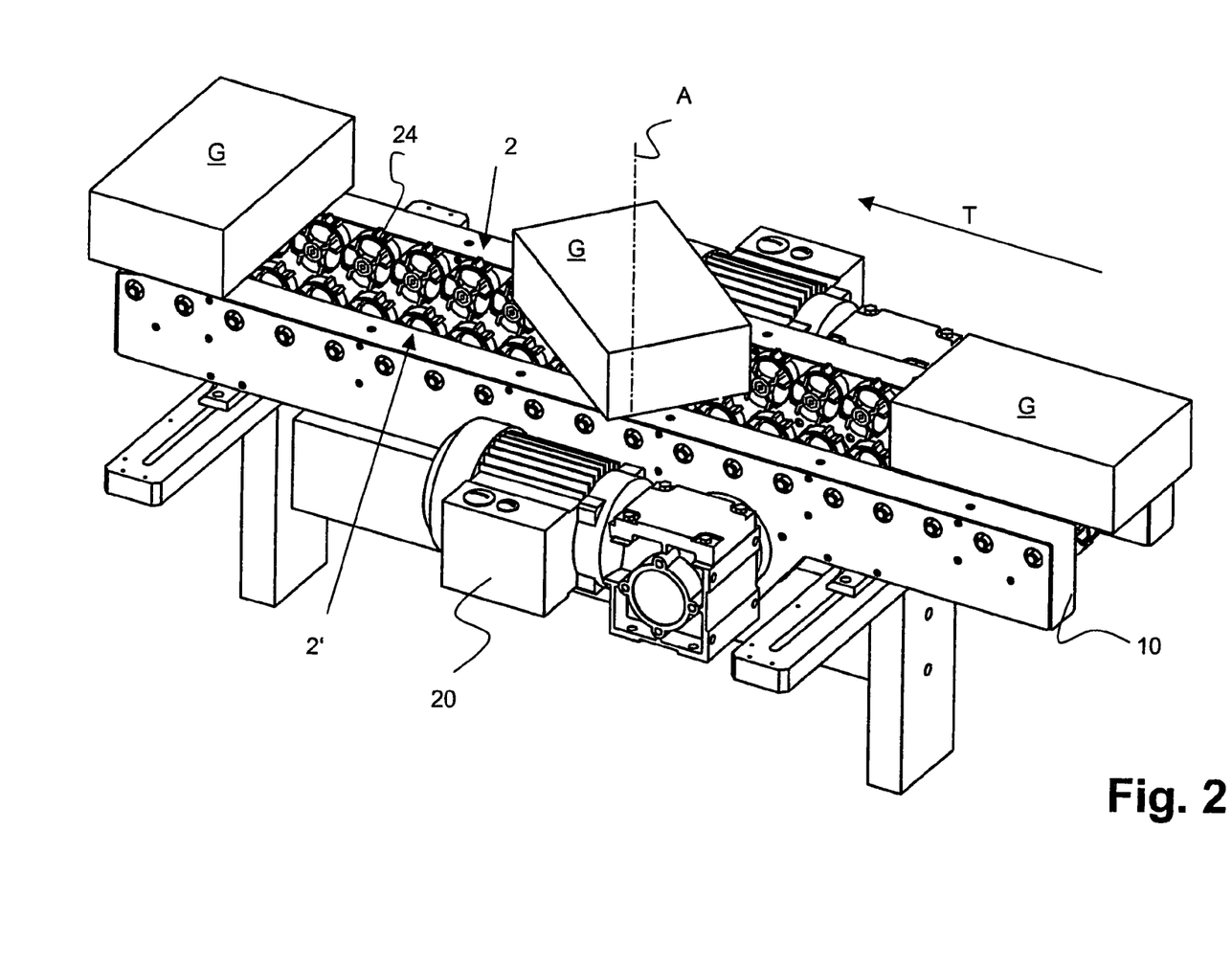
FIG. 2 shows a detail of the apparatus according to FIG. 1 with boxes arranged thereon.

FIG. 1 illustrates a first exemplary embodiment of the apparatus according to the invention. Two longitudinal and rotary conveyors 2, 2' are arranged on two spaced-apart side panels 10 of a framework 1. These longitudinal and rotary conveyers 2, 2' extend along a transporting direction T which is illustrated by an arrow. The corresponding rotary and transporting planes for the articles G which are to be transported and rotated, and are illustrated in FIG. 2, thus preferably run horizontally.

The longitudinal and rotary conveyors 2, 2' are followed by a horizontal conveyor 3. The latter may be arranged on the same or a different framework 1. An aligning means, in this case a stopping means 4, is preferably provided in the region of the horizontal conveyor 3.

Figure 4A:
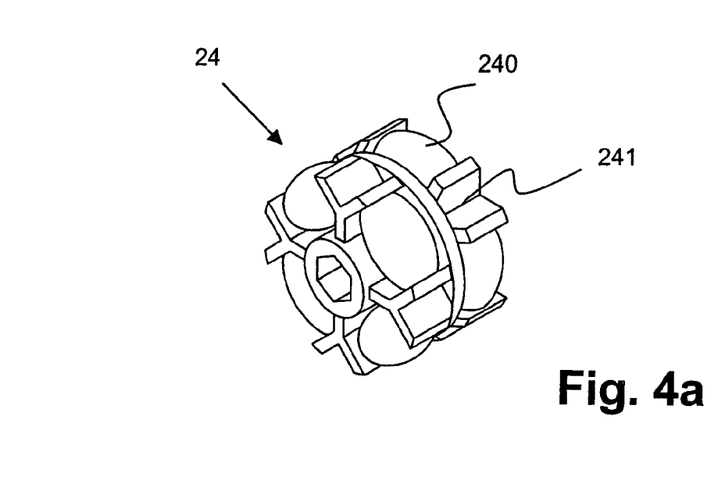
FIG. 4a shows a perspective view of an omnidirectional roller.
Figure 4B:
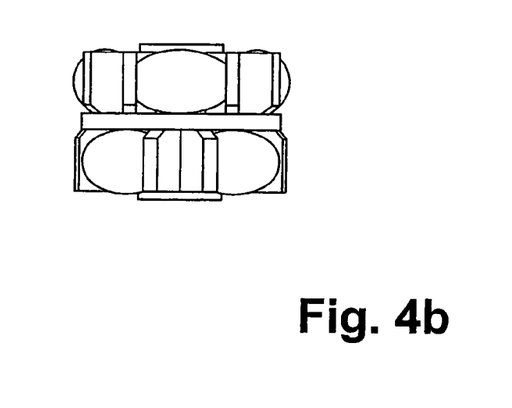
FIG. 4b shows a view of the omnidirectional roller according to FIG. 4a from above.
Figure 4C:
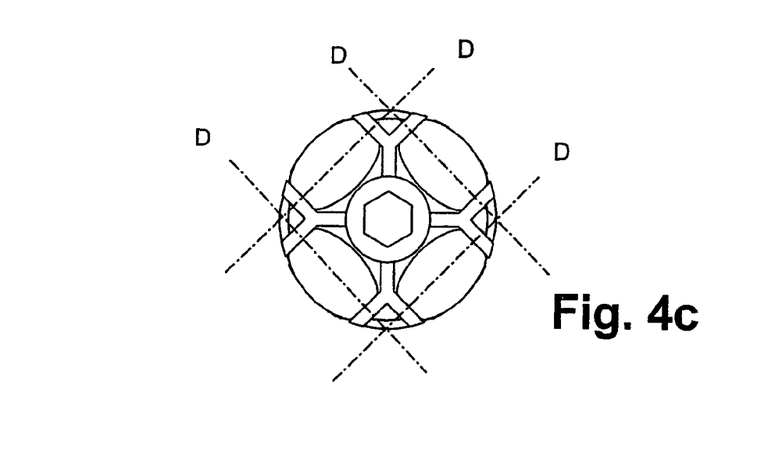

In the example illustrated here, each of the longitudinal and rotary conveyors 2, 2' is formed by a plurality of omnidirectional rollers 24 which are arranged individually one behind the other in the transporting direction T. It is also possible, however, for them to be arranged in groups one behind the other. Such omnidirectional rollers 24 are known from the prior art. Just one possible embodiment thereof will be described here. As is illustrated in FIGS. 4a to 4c, they have a cage 241 in which convex elongated rollers 240 are retained. The rollers 240 are distributed uniformly over the circumference of the cage 241 and can be rotated freely about axes of rotation D. For the apparatus according to the invention, as is illustrated here, use is preferably made of double-row omnidirectional rollers, in the case of which the rollers 240 of the two rows are offset by an angle in relation to one another. This ensures that the article rests on a roller 240 in each rotary position of the cage 241. The omnidirectional rollers 24 used here have direction-dependent coefficients of friction in respect of the bearing plane, these coefficients of friction preferably being greater in the transporting direction T than those in a direction S which is perpendicular thereto. It is also possible, for example, for two straightforward omnidirectional rollers to be arranged such that they are turned at an angle one beside the other on a common axis of rotation.

Figure 3:
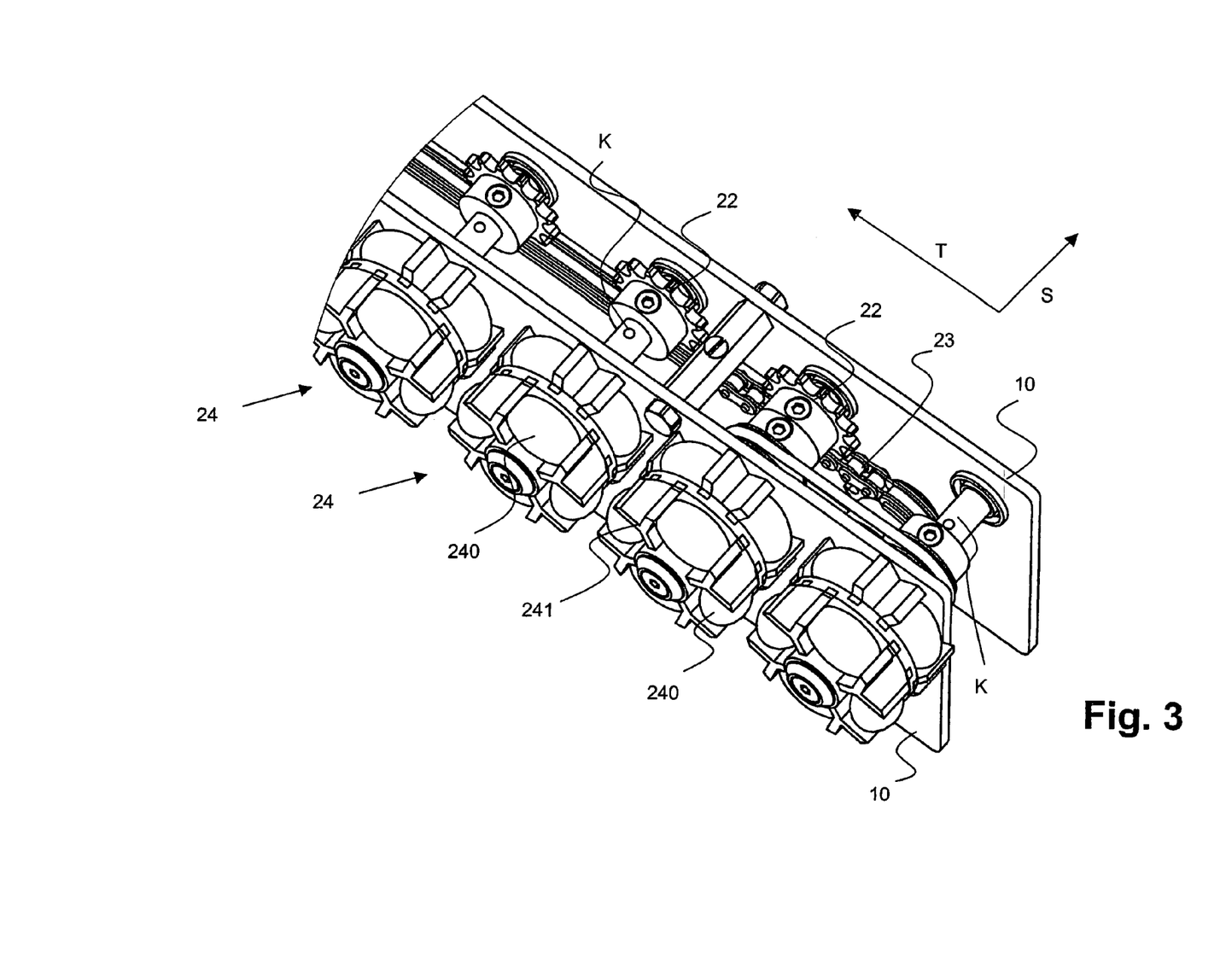
FIG. 3 shows a perspective view of part of the apparatus according to FIG. 1 with omnidirectional rollers and a drive illustrated.

As can be seen in FIG. 3, the omnidirectional rollers 24 arranged one behind the other, and/or their cages 241, are arranged on a respective shaft, which defines the axis of rotation K for the cages. These axes of rotation K run parallel to the bearing plane, but perpendicular to the transporting direction T. The shafts are driven together. Each conveyor 2, 2' has a dedicated drive. The shafts of each conveyor 2, 2' are connected to one another via a common drive means, in this case a circulating drive chain 23. The chain 23 engages in a plurality of gear mechanisms 22, which are each connected to one of the axes K. The chain 23 and the gear mechanisms 22 are preferably arranged in the side panels 10. Each chain 23 is connected to a dedicated drive motor 20, which is illustrated in FIG. 1. Each conveyor 2, 2' thus has a dedicated drive.

It can be seen in FIG. 2 how, by means of the apparatus according to the invention, an article G, in this case a box, is rotated and, at the same time, transported. This takes place by virtue of the two conveyors 2, 2' being driven differently, with the result that they have different transporting speeds. This means that the cages 241 belonging to a common conveyor 2, 2' are rotated at the same speed about the axis of rotation K, the cages 241 of different conveyors 2, 2' having different speeds of rotation. Since the box rests on the rollers 241, and the axes of rotation D of the latter, in this state of contact, run parallel to the transporting direction T, the box is rotated about an axis A perpendicular to the bearing plane and, at the same time, transported forward. The angle of rotation achieved depends on the relative speed of the conveyors 2, 2'. In this case, the box has been rotated through 90°. Corresponding control of the drive of the conveyors 2, 2', however, make it possible to achieve any desired angles of rotation.

The article G can be aligned even more precisely following rotation. The stopping means 4 is provided for this purpose in FIG. 1. It has two parallel, preferably synchronously driven circulating conveying chains 40 and at least one stopping element 41 which is fixed to the conveying chain 40. Two or more stopping elements 41 are preferably provided. The rotated article leaves the conveyors 2, 2' following rotation and passes downstream onto the horizontal conveyor 3, which in this case is formed by two parallel, preferably synchronously driven conveying belts. The stopping elements 41, which are arranged in relation to one another at the desired angle of rotation for the article, serve as a stop for the incoming box and align the latter, if appropriate, to the full extent.

Figure 5:
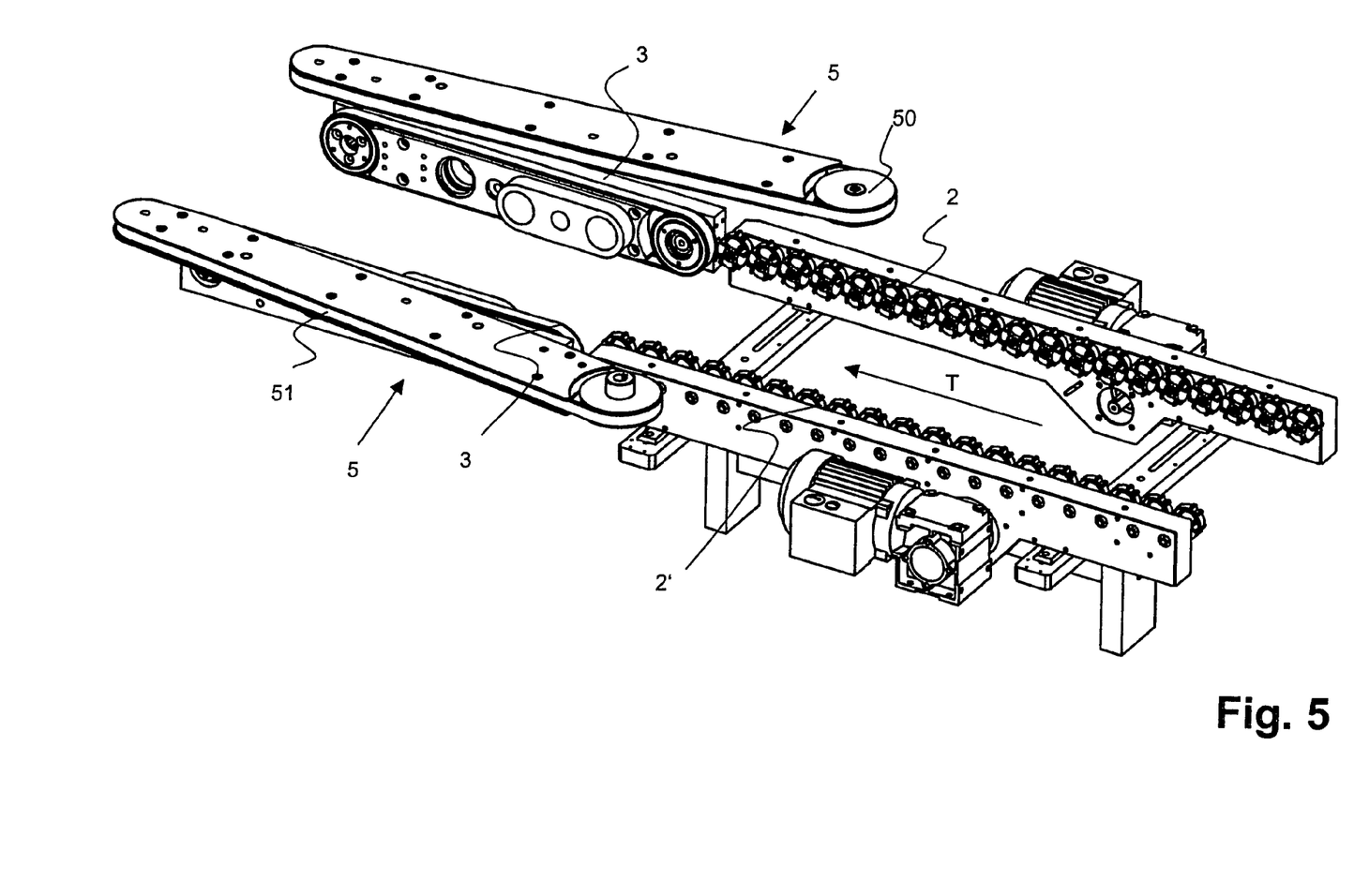
FIG. 5 shows a perspective view of a second embodiment of the apparatus according to the invention.

A different aligning method is illustrated in FIG. 5. Here, a lateral guide means 5 is provided as the aligning means. The guide means has in each case one lateral conveying belt 51 which is arranged on one side of the transporting path in each case and runs around a drive roller 50 and a deflecting roller. These two conveying belts 51 accommodate the box and align it further. Depending on the type of article, there is no need for the horizontal conveyors 3 in this case. It is also possible, however, to use the lateral guide means 5 together with the above described stopping means 4.

Figure 6:
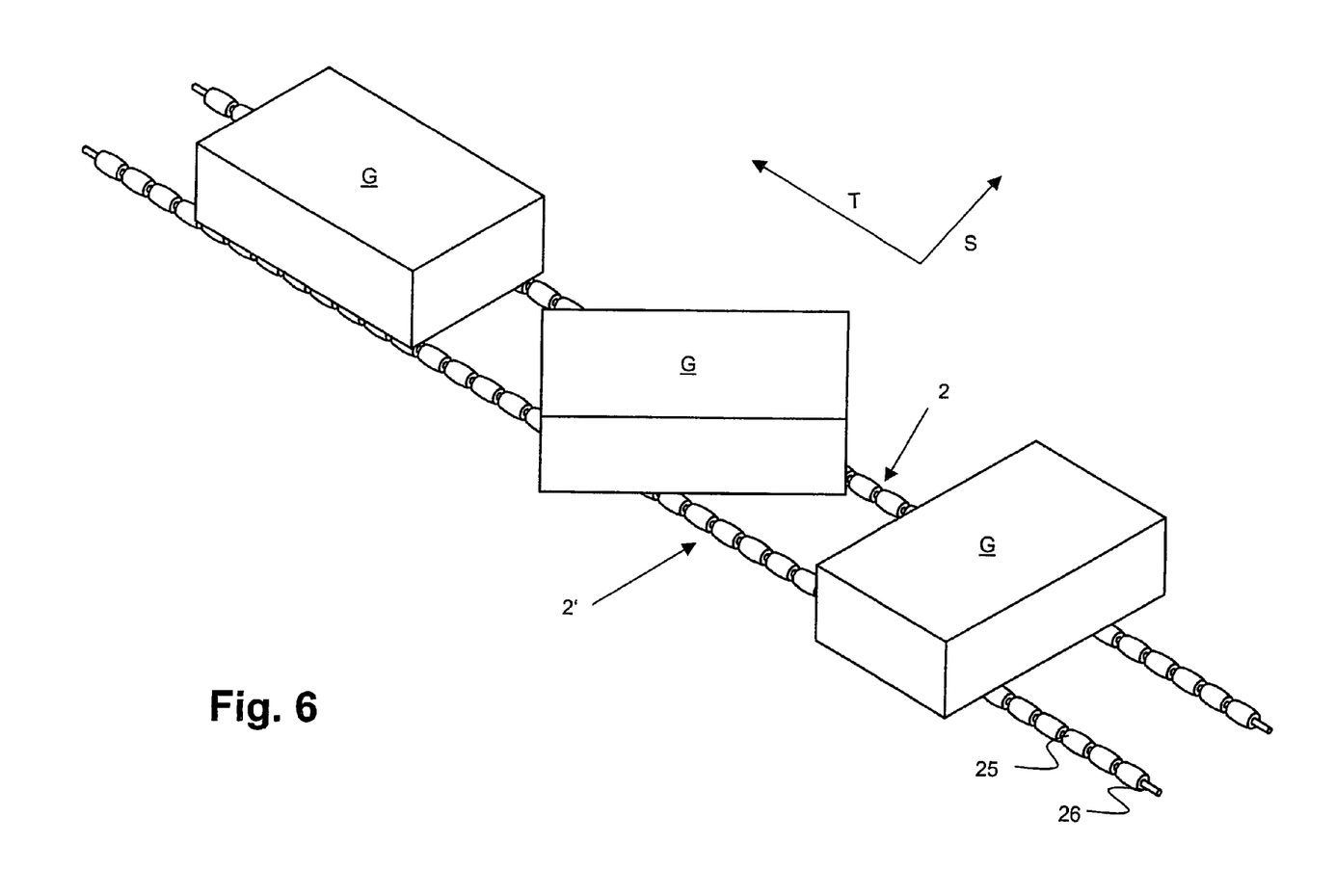
FIG. 6 shows a perspective view of the essential parts of a third embodiment of the apparatus according to the invention.

FIG. 6 illustrates a further exemplary embodiment of the apparatus according to the invention. In this case, use is made, instead of omnidirectional rollers, of convex longitudinal rollers 25 which are fixed in position on a circulating strand-like pulling means 26, for example a wire cable, but are freely rotatable about their longitudinal axis D. Only the top strand of the pulling means 26 is illustrated in FIG. 6. The pulling means 26 circulates in a known manner about a deflecting roller and is driven by a drive roller. As is illustrated here, each longitudinal and rotary conveyor 2, 2' has exactly one pulling means 26. It is also possible, however, for two or more pulling means 26 to be arranged one beside the other and to be driven together. As in the embodiments described above, the pulling means 26 of the two conveyors 2, 2' are also provided with different transporting speeds for conveying the boxes G. Forward transportation takes place by the pulling means circulating in the transporting direction T. Rotation takes place by virtue of the relative speed between the two conveyors 2, 2' and the freely rotatable longitudinal rollers 25. Here too, the longitudinal rollers 25 thus have direction-dependent coefficients of friction in respect of the bearing plane, these coefficients of friction preferably being greater in the transporting direction T than those in the direction S which is perpendicular thereto.

The apparatus according to the invention thus allows straightforward rotation and transportation of articles, there being barely any need for the apparatus to be adapted to the shape and size of the articles.

LIST OF DESIGNATIONS

G Article
T Transporting direction
S Direction running in the transporting plane and perpendicularly to the transporting direction
A Axis of rotation of the article
D Axis of rotation of the roller
K Axis of rotation of the cage
1 Framework
10 Side panels
2 First longitudinal and rotary conveyor
2' Second longitudinal and rotary conveyor
20 Drive motor
22 Gear mechanism
23 Drive chain
24 Omnidirectional roller
240 Roller
241 Cage
25 Longitudinal roller
26 Strand-like pulling means
3 Horizontal conveyor
4 Stopping means
40 Conveying chain
41 Stopping element
5 Lateral guide means
50 Drive roller
51 Lateral conveying belt The entire disclosure of Switzerland Patent Application No. 01251/03 filed Jul. 17, 2003 is incorporated by reference.

What is claimed is:

1. An apparatus for rotating an article, the apparatus having means arranged in a bearing plane, the article resting on these means by way of a base surface, and the rotation of the article taking place about an axis running perpendicularly to the bearing plane, wherein at least two conveyors are present, the at least two conveyors extending along a transporting direction and being spaced apart at least more or less parallel to one another, wherein the conveyors contain means for bearing the base surface of the article, wherein at least a first of the conveyors can be driven, in order for at least that region of the article which rests on the associated means to be transported in the transporting direction, this first conveyor having a transporting speed which is different from that of the other longitudinal and rotary conveyors or the other longitudinal and rotary conveyor, and wherein these means have direction-dependent coefficients of friction in respect of the bearing plane, these coefficients of friction being greater, in particular, in the transporting direction than those in a direction which is perpendicular thereto, and runs in the bearing plane, wherein each conveyor has a plurality of these means, the means being arranged individually or in groups one behind the other in the transporting direction and having rollers, and wherein the rollers are arranged individually or in groups in cages and all of the cages have axes of rotation which are arranged at least more or less perpendicularly to the transporting direction.

2. The apparatus as claimed in claim 1, wherein each of the rollers has an axis of rotation which, at least in a state in which said roller is in contact with the base surface, runs at least more or less parallel to the transporting direction.

3. The apparatus as claimed in claim 1, wherein at least a second of the conveyors can be driven, this conveyor having a transporting speed which is different from that of the first conveyor.

4. The apparatus as claimed in claim 1, wherein each conveyor has a plurality of cages, the cages of each of the conveyors being arranged individually or in pairs one behind the other in the transporting direction.

5. The apparatus as claimed in claim 4, wherein the cages of one of the conveyors are driven at the same speed, in particular together.

6. The apparatus as claimed in claim 4, wherein a plurality of rollers are distributed over a circumference of the cage, each roller having an axis of rotation which, in the state in which said roller is in contact with the base surface, runs parallel to the transporting direction.

7. The apparatus as claimed in claim 1, wherein omnidirectional rollers are present, and wherein the rollers form a constituent part of the omnidirectional rollers.

8. The apparatus as claimed in claim 7, wherein at least two omnidirectional rollers are arranged one beside the other and form two rows, or wherein a double-row omnidirectional roller is present, and wherein the rollers of each row are designed identically but are arranged such that they are turned through an angle in relation to one another.

9. The apparatus as claimed in claim 1, wherein an aligning means for aligning the article in a precisely positioned manner is present in the region which follows the conveyors in the transporting direction, the aligning means, in particular, having a stopping element and/or being a lateral guide means.

10. An apparatus for rotating an article, the apparatus having means arranged in a bearing plane, the article resting on these means by way of a base surface, and the rotation of the article taking place about an axis running perpendicularly to the bearing plane, wherein at least two conveyors are present, the at least two conveyors extending along a transporting direction and being spaced apart at least more or less parallel to one another, wherein the conveyors contain means for bearing the base surface of the article, wherein at least a first of the conveyors can be driven, in order for at least that region of the article which rests on the associated means to be transported in the transporting direction, this first conveyor having a transporting speed which is different from that of the other longitudinal and rotary conveyors or the other longitudinal and rotary conveyor, and wherein these means have direction-dependent coefficients of friction in respect of the bearing plane, these coefficients of friction being greater, in particular, in the transporting direction than those in a direction which is perpendicular thereto, and runs in the bearing plane, wherein each conveyor has a plurality of these means, the means being arranged individually or in groups one behind the other in the transporting direction and having rollers, wherein the rollers are longitudinal rollers which are arranged one behind the other in the transporting direction on a strand-like circulating pulling means, the longitudinal rollers being arranged on the pulling means such that they can be rotated but cannot be displaced in the transporting direction, their axes of rotation running parallel to the transporting direction and their longitudinal length being a multiple smaller than the article rotated thereon, and each conveyor having at least one such pulling means.

* * * * *